US006533469B1

United States Patent
Nakamura et al.

(10) Patent No.: US 6,533,469 B1
(45) Date of Patent: Mar. 18, 2003

(54) FERRULE FOR CONNECTING OPTICAL FIBERS, METHOD OF PRODUCING THE SAME AND OPTICAL FIBER CONNECTOR USING THE SAME

(75) Inventors: Noboru Nakamura, Kyoto (JP); Masayuki Yamahiro, Kitami (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/637,455

(22) Filed: Aug. 11, 2000

(30) Foreign Application Priority Data

Aug. 11, 1999 (JP) .......................... 11-227962

(51) Int. Cl.⁷ ............................... G02B 6/36
(52) U.S. Cl. ........................................ 385/84
(58) Field of Search ..................... 385/84, 66

(56) References Cited

U.S. PATENT DOCUMENTS 5,778,126 A * 7/1998 Saitoh ..................... 264/1.1
5,790,732 A * 8/1998 Ueda ....................... 385/139
6,048,104 A * 4/2000 Ohkubo et al. .............. 385/78
6,158,900 A * 12/2000 Omiya et al. ................ 385/60

FOREIGN PATENT DOCUMENTS

JP  2000-193847  7/2000

* cited by examiner

Primary Examiner—Lynn Field
Assistant Examiner—Hae Moon Hyeon
(74) Attorney, Agent, or Firm—Hogan & Hartson, LLP

(57) ABSTRACT

The ferrule of the prior art requires an assembling process, high accuracy machining of the fitting portion, machining of the insert to achieve concentricity, machining of the cone and machining of the outer diameter with a high accuracy. This has been making a factor that increases the production cost of the ferrule which is required to have lower price. The present invention provides an ferrule comprising an insert of substantially cylindrical shape that has a fine hole for housing an optical fiber in the axial direction, and an ferrule body made of a resin for accepting the insert fitted therein, characterized in that: the ferrule body has a through hole made in the axial direction thereof, and the through hole communicates with the fine hole of the insert via a tapered hole, with concentricity between the fine hole of the insert and the periphery of the ferrule body being within 10 μm.

8 Claims, 3 Drawing Sheets

FERRULE FOR CONNECTING OPTICAL FIBERS, METHOD OF PRODUCING THE SAME AND OPTICAL FIBER CONNECTOR USING THE SAME

BACKGROUND OF THE INVENTION

1. Field of the Invention

The present invention relates to a ferrule for connecting optical fibers used in optical communication, and to an optical fiber connector using the same. Further, the present invention relates to a method for fabricating such a ferrule for connecting optical fibers.

2. Prior Art

In many optical communication systems, optical fiber connectors have widely been used in portions in the optical lines required to connect between the optical fiber lines or to switch between optical devices and transmit/receive ports, and to adjust or measure optical devices. Usually, such optical connection for coupling optical fibers is achieved by connecting a pair of ferrules fixing optical fibers, both ends of the optical fibers being in contact with each other at the ends of the ferrules.

An Example of conventional ferrules used in the optical fiber connectors is described in Japanese Patent Publication JP 2000-193847, as shown in FIG. 6, wherein an insert 10, having a fine central hole, which is made of ceramics or glass, is buried and fixed in the recess in an end portion of an cylindrically elongated, hollow ferrule body 2, which is made of metal, such as stainless steel, brass or albata. In fabricating, the insert have been inserted into the end surface of the holder by pressing, fitting or bonding, thereby assembling a ferrule.

Also, another type of ferrule has been known, as shown in FIG. 7, in which, similarly, an longer insert 10 of ceramics is inserted into an ferrule body 2 at a flange portion, by pressing, fitting or bonding with an adhesive. The ferrule body is made of metal, e.g., stainless steel, in a substantially cylindrical shape.

Such a ferrule is connected to an optical fiber whose end is inserted through the through hole of the holder into the opening surface of the insert.

In connecting a pair of ferrules, the ferrules are inserted through a sleeve fixed inside a connector body on opposite sides to abut the end surfaces of both ferrules, then connecting the end surfaces of the fibers to be capable of passing a beam of laser light from one optical fiber to the other.

Fabrication of the conventional ferrules shown in FIG. 6 and 7 has required some steps of press fitting or bonding the insert into a opening of the holder, and therefore, previously machining of the joining portions of the holder has been carried out with high accuracy to achieve required dimensions in the joining portions. It has also been necessary to machine a conical or tapered opening 220 extending in the end of the fine hole 11 in the insert 2 in order to easily introduce the end portion of the optical fiber along the through hole 21 of the holder 2 into the fine hole 11.

After assembling the ferrule body 2 and the insert 10, further, the holder has been subjected to precise grinding in the defined outer diameter by taking reference to a center axis of the fine hole 11, because the periphery of the ferrule body must be highly concentric with the fine hole 11 of the insert 10. However, there has been a problem that the concentricity around the holders so fabricated often are deviated, although within the standard range. Further, this mechanical grinding operation is an important factor to increase production cost of ferrules, and ferrules must have lower price.

While prior art ferrules are made by machining the insert 10 on the fine hole 11 and the peripheral surface thereof with a high accuracy in advance and then joining the ferrule body 2 thereto as described above, the desired degree of concentricity between the fine hole 11 and the peripheral surface of the ferrule body 2 could not be achieved, and then, additional machining of the periphery has been required to improve the concentricity.

SUMMARY OF THE INVENTION

An object of the present invention is to provide a method of producing an ferrule comprising an insert having hole to fix an optical fiber and an ferrule body to fit the insert on an end thereof which has a high dimensional accuracy in peripheral diameter of the ferrule body.

Another object of the invention is to provide a method of producing such an ferrule with high dimensional accuracy, particularly, without machining the ferrule.

In the present invention, an ferrule is provided which comprises: an ferrule body of a cylindrical shape through which a through hole extends concentrically; and an insert on the end of the ferrule body formed with a fine hole communicating to the through hole in the ferrule body in order to fix an end portion of an optical fiber passing through the through hole of the holder into the fine hole of the insert, wherein the ferrule body is formed of synthetic resin and has concentricity of 10 $\mu$m or less of the peripheral surface with respect to the center of the fine hole of the insert.

In the present invention, to fix the end portion of a fine optical fiber, the fine hole is set to be finer than the through hole, and therefore a tapered face is provided between the fine hole in the insert and a through hole in the ferrule body. The tapered face may be formed at the end of the insert or, more preferably, on the side of the ferrule body.

In the present invention, an ferrule is fabricated by the steps of: fixing an insert in an end portion of a cavity formed with a profile of a ferrule body to be molded in a mold, the center of the fine hole being positioned and supported on the center of the cavity by a tapered tip of a cylindrical core arranged along the center of the cavity; and injecting a synthetic resin into the cavity to produce the ferrule body in the end of which the insert is imbedded.

In the method of injection molding, the insert is integrated with the ferrule body made of the synthetic resin after injected and cured in the cavity, and then the periphery of the ferrule body may be prepared with high dimensional accuracy with reference to the center of the insert hole, then, achieving high concentricity of the ferrule body to the fine hole of the insert to eliminate the need for machining the peripheral surface of the holder.

BRIEF DESCRIPTION OF THE DRAWINGS

The present invention will be explained below in more detail with reference to the accompanying drawings, in which.

PREFERRED EMBODIMENT OF THE INVENTION

Figure 1:
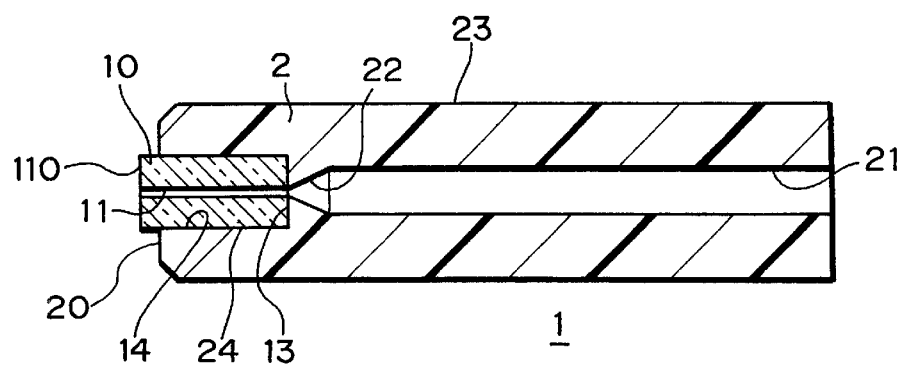
FIG. 1 is a sectional view showing the ferrule of an embodiment according to the present invention.

FIG. 1 shows a ferrule 1 according to an embodiment of the invention, which comprises a ferrule body 2 with a through hole 21 extending along its longitudinal direction and an insert 10 as a fiber end fixing member, which is embedded inside an end portion of the ferrule body 2, with at least an end surface 110 exposed on the end face 20 of the body 2.

The insert 10 is of cylindrically tubular shape, having a fine hole 11 passing therethrough in order to house an end portion of an optical fiber in the axial direction, and the optical fiber extends through the through hole in the ferrule body.

The through hole 21 in the ferrule body 2 communicates with the fine hole 11 in the insert 10 via a tapered hole 22 of the through hole 21 in which case the tapered hole is formed on the side of through hole 21 of the ferrule body 2.

Similar effect to this structure may be achieved also by means of flanged shape of the ferrule body 2 such as SC ferule.

Although as shown in FIG. 1, an insert 10 protrudes from the ferrule body 2, similar effect can be achieved also with such a configuration as the insert 10 is flush with the ferule body 2 at the end thereof or retreated therefrom. Then, the optical fiber connector can be made by holding the end of the optical fiber on the ferrule 10 and bringing the end face thereof into. contact with the end face of the other ferrule 10.

An insert 10 for the ferrule of the invention may be made of ceramics such as alumina and zirconia, or glass such as borosilicate glass and crystallized glass.

On the other hand, a ferrule body 2 may be made of engineering plastics such as polyetherimide (PES), polyetherimide (PEI), polyphenylene sulfone (PPS) or polyamide (PA) or an alloy resin containing any of the former as a principal component.

Now the method of producing the ferrule body 2 will be described below.

Figure 2:
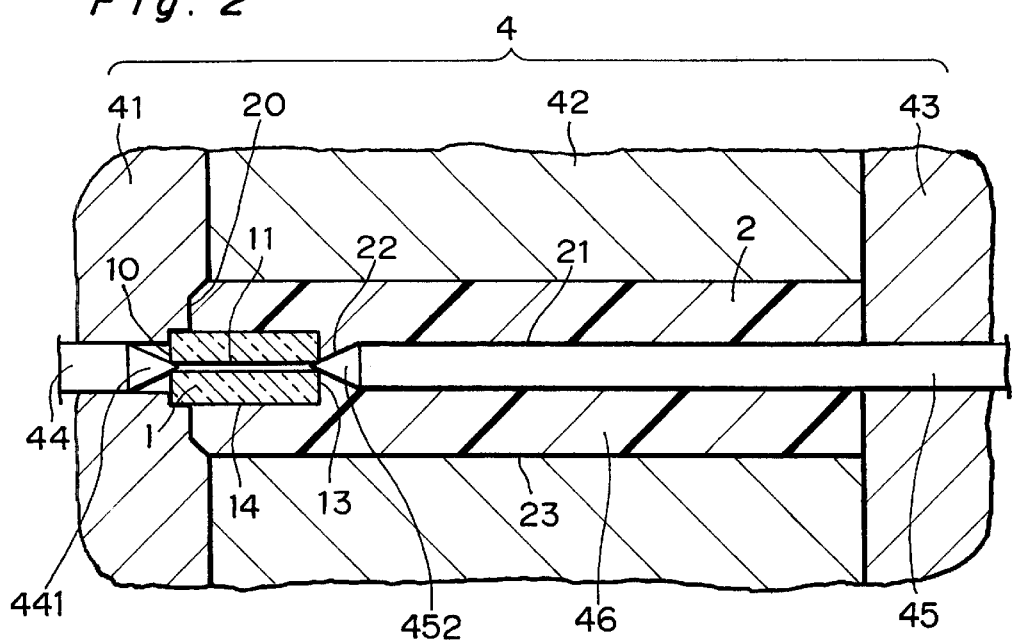
FIG. 2 is a sectional view showing the schematic mold structure for injection molding a synthetic resin to produce a ferrule according to an embodiment according to the present invention.

FIG. 2 is a sectional view showing the basic structure of a mold for molding a resin according to the present invention.

In this example, the mold 4 may include a central mold 42 having a cavity 46 of sectionally circular cylindrical shape passing through the central mold 42, a front plate 41 for sealing a front portion of the cavity 46 by connecting to the central mold 42 on the front side, and a rear plate 43 for sealing the rear portion of the cavity to connect to the central mold on rear side, the cavity may be used to be filled with a liquid resin to mold a cylindrical ferrule body.

A pin 44 is arranged for supporting a front end 10 of the fine hole 11 of the insert 10 and a cylindrical core 55 is inserted in the cavity for supporting a rear end 13 of the fine hole 11 of the insert 10, both of which are coaxial with the axis of the cavity. Particularly, the cylindrical core 45 is supported in the rear plate 43 to be projected in the cavity coaxially and used for forming a through hole of a ferrule body after molding a resin. Further, the cylindrical, centrally-positioned core 45 is provided with a tapered tip 452 to support the fine hole 11 of the insert 10 in the cavity 42 and the same time to form a tapered face at the end of the resulting through hole 21.

Moreover, the central mold 42 has a gate (not shown) for pouring liquid resin into the cavity 46. The pin 44 and core 45 may be attached in the mold movably back and forth with the tips thereof being tapered, and positioned on an axis of the cavity 46, causing a fine hole of the insert arranged to be positioned extremely accurately on the cavity axis.

In the molding operation, first, the pin 44 and core 45 fix an insert in a cavity in a fixed position and plug both openings of the fine hole 11 of the insert 10.

The mold 4 is fabricated from a front plate 41, a central mold 42, and a rear mold 43 while the pin 44 and core 45 are catching and fixing an insert 10 with both tapered tips and positioning it in a fixed position in a cavity 42, and at the same time, plug both openings of the fine hole 11 of the insert 10 with the tapered tips. Then, a liquid resin is poured into the cavity via the gate and is filled in the cavity, but the plugged fine hole 11 of the insert remains empty. Thereafter, the mold is removed and the core 45 is withdrawn, obtaining a ferrule body incorporated with the insert.

Preferably injection molding process may he adopted to pour a resin into the mold, but other methods such as press molding or transfer molding may also be employed provided that a mold of the similar configuration can be used.

According to this process of the invention, accurate formation of an outer diameter of a ferrule body 2 and tapered face 22 communicating with its through hole 21 to be achieved can be secured by the pin 44 and core 45 which have been arranged to position the insert in the mold cavity 46 precisely coaxially. Consequently, this method can produce the outer diameter of the periphery 23 of the ferrule body 2 concentrically to the fine hole 11 with a high accuracy, eliminating the need for the conventional working processes including grinding an outer surface of the insert, forming a tapered face of fine hole and machining for securing desired concentricity. However, the inserts having been previously subjected to such working processes can be used in the inventions and can achieve similar effect.

In this method, since the tapered tip of the pins 44 and core 45 are engaged in both openings of the fine hole 11 extending in the insert 10 to position the insert precisely along the axis of the cavity 46, high accuracy of concentricity between the insert 10 and the periphery 23 of the ferrule body 2 can be obtained with little variation, not being affected by any concentricity of the periphery 14 of the insert to its fine hole 11.

In this embodiment, the tapered face 22 formed in a resin of the ferrule by using the tapered tip of the central core 45 which is inserted into the fine hole 11 of the insert 10 can provide the similar function for guiding an optical fiber into the fine hole 11 through the through hole in the ferrule body.

The method of the present invention can omit the conventional operations of assembling ferrule bodies and inserts which have required much labor and time, by molding a ferrule body 2 and an insert 10 integrally by injection molding process. Moreover, as described above, the present method can eliminate the need for machining an insert 10 on the outer diameter with a high accuracy, a cone opening of the fine hole and a periphery 14 of the insert to achieve concentricity of the fine hole 11. The ferrule of the present invention can be produced at a lower cost through the reduction of the assembly operation.

Moreover, since the necessity for the machining to achieve concentricity is eliminated and the inner and outer diameters are determined by taking reference to the mold, concentricity of 10 μm or less in average can be achieved between the fine hole 11 and the periphery 23 of the ferrule body 2, and also stable performance with less variation can be achieved. In order to achieve optical characteristics of high reliability by bringing the ends of the optical fiber connectors into contact with each other, concentricity is preferably within 1.4 μm for single mode and within 6.0 μm for multiple mode.

Figure 3:
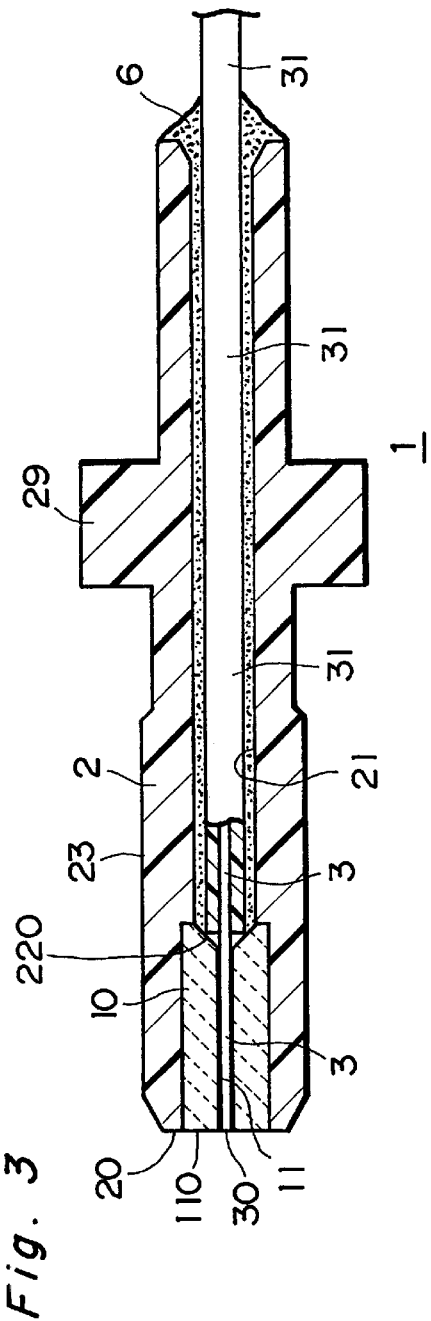
FIG. 3 shows a cross-sectional view of a ferrule with an optical fiber inserted and fixed therein according another embodiment of the invention.

In another embodiment of the invention, FIG. 3 shows a ferrule structure with an optical fiber 3 fixed therein, the ferule 1 is similar to the above embodiment ferrule, except for the following. An insert 10 has a tapered face 220 of the opening of the fine hole 11, communicating to the through hole 21 of the ferrule body 2. Although it is necessary to form the tapered face in the opening of the insert, made of ceramics or glass, the ferrule can be easily molded by using the same mold structure and molding process described above and illustrated in FIG. 2. The insert 10 having the tapered face 220 is interposed between the tapered tips 441 and 452 of the pin 44 and the core 15 prior to the molding of a resin such that the tapered face 220 of the fine hole opening may be attached ot the tapered tip 452 of the centered core 45.

In this embodiment, a flange 29 is shaped integrally around the rear periphery of the ferrule body 2. In order to mold such a ferrule with a flange, the central mold 42 may be divided to at least two parts of partial molds, not shown in any figurer, facilitating the flange 29 about the ferrule body 2 to be molded and also later removed from the mold.

In this embodiment, similarly an insert 10 is embedded in an end portion of the ferrule body 2, but an end face 110 of the insert 11 is made substantially copolanar to the end face 20 of the ferrule body 2.

FIG. 3 shows an optical fiber 3 connected to the ferrule 1, wherein the optical fiber 3 having a protective coating 31 is inserted from the rear opening through the through hole 21 of the ferrule body 2, to reach the fine hole 11 of the insert 10 so that an end portion of the optical fiber 3 which is peeled off the protective coating 31 terminates in the fine hole 11 in the insert, and the end face 30 of the fiber 3 flushes to the end face 110 of the insert 11. The clearance between the optical fiber 3 and both the fine hole 11 and through hole 21 is filled with an suitable adhesive 6 to bond the optical fiber to the interior of the ferrule 1.

Optical fibers to be used in the invention are particularly not limited but typically may have 0.125 mm diameter of a fiber glass. Ferrule sizes are free to be selected and may typically be adopted so as to have 2.5 mm and 1.25 mm in diameter of the peripheral surface 23 of a ferrule as standards.

Figure 4:
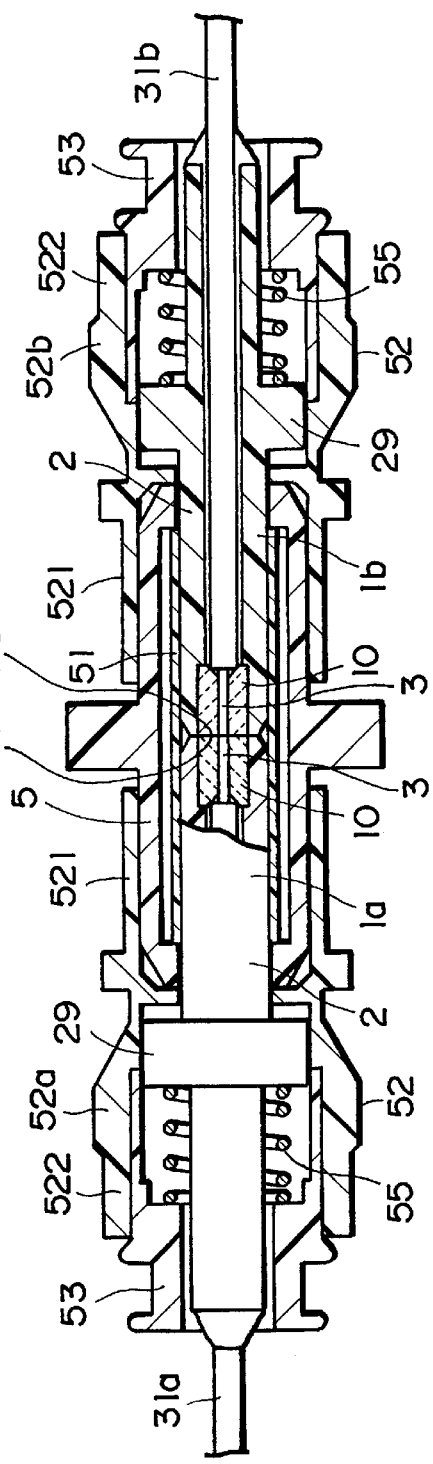
FIG. 4 shows a cross-sectional view of an optical fiber connector to combine two optical fiber inserted and fixed therein according another embodiment of the invention

FIG. 4 illustrates an optical connector in the invention which is fabricated by using two ferrules shown in the above embodiment. This optical connector comprises a adapter housing 5 and a sleeve 51 housed in a hollow of the housing 5 in which to be inserted by the two ferrules 1a and 1b from both side openings, a pair of plug housings 52a and 52b which each comprises a threaded portion 521 to fasten on the side portion of the ferrule sleeve 51 and a mouth portion 522 to receive a flange 29 of the ferrule body 2, and a pair of hollow plugs 53 and 53 which each is inserted into the mouth portion 522 with a thread and presses a coil spring 55 toward the insert side to push the flange 29, then forcing both inserts 10 and 10 of the ferrules 1a and 1b to bring into contact to each other. Thus, the pair of the ferrule can be connected to each other in the-ferrule housing 5 to maintain near or full contact of both end optical face 30 and 30 of the fibers 3 and 3, coupling the light signals from one of the fibers to the other with high light transmission efficiency. Since the ferrules 1 and 1 of the invention are provided with highly accurate concentricity of the outer diameter of the ferrule body to the center of the fiber axis, coupling of both fibers are easily realized with little deviation of axes of both the optical fibers.

EXAMPLES

Experiments were conducted as follows. 100 ferrules 1 were fabricated as Example of the present invention by the method shown in FIG. 2, by using the insert 10 that has the fine hole 11 of diameter 0.126 mm and molding ferrule bodies 2 from polyether sulfone with dimensions of 2.499 mm in outer diameter and 12 mm in total length.

Figure 6:
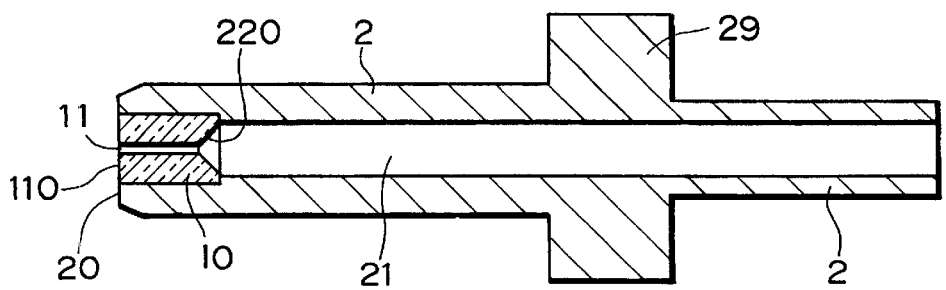
FIG. 6 is a cross-sectional view of a conventional ferrule.
Figure 7:
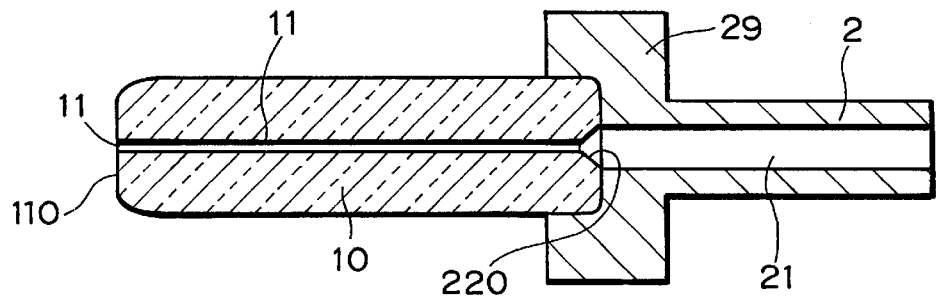
FIG. 7 is a cross-sectional view of another conventional ferrule.

As Comparative 1, 100 pieces of ferrules shown in FIG. 6 were fabricated by inserting the insert 10, that has the fine hole 11 of diameter 0.126 mm and the tapered face of the opening of the fine hole 11 formed therein to allow smooth insertion of the optical fiber, with pressure into a stainless steel pipe and machining the outer diameter thereof to 2.499 mm and total length to 12 mm. As the Comparative 2, 100 pieces of ferrules shown in FIG. 7 were fabricated by inserting the insert 10 made of zirconia, that has the through hole 11 of diameter 0.126 mm, outer diameter 2.499 mm and total length of 10.5 mm and the cone formed therein to allow smooth insertion of the optical fiber, while concentricity thereof being kept within 1.4 μm by machining, with pressure into the ferrule body 2 having substantially cylindrical shape with the total length being machined to 16 mm. The ferrules of these examples were compared with respect to the concentricity.

Figure 5:
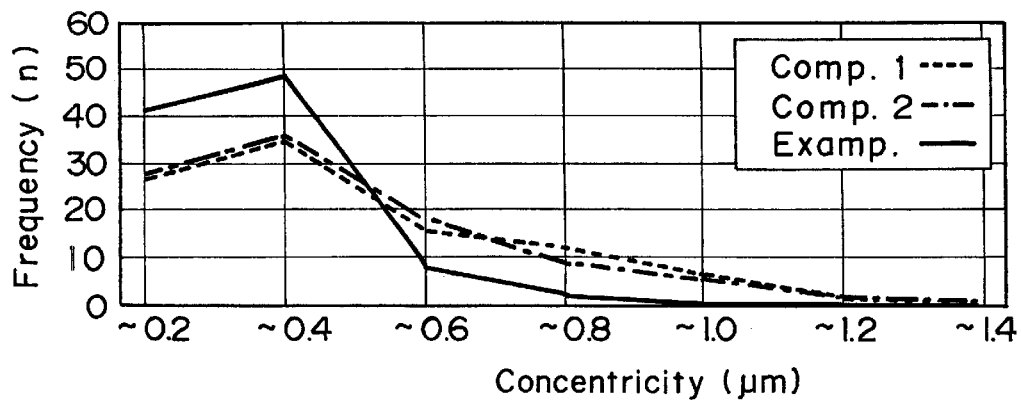
FIG. 5 is a graph comparing concentricity distribution which was measured with ferrule samples fabricated by a method according to a method embodiment of the present invention.

The results are shown in Table 1, and the distribution of concentricity is shown in FIG. 5

TABLE 1

|  | Concentricity | | | |
|---|---|---|---|---|
|  | Average value [μm] | Standard deviation [μm] | x +3s [μm] | Number of samples |
| Example | 0.24 | 0.14 | 0.66 | 100 |
| Comparative 1 | 0.39 | 0.28 | 1.22 | 100 |
| Comparative 2 | 0.38 | 0.27 | 1.18 | 100 |

TABLE 2

|  | Concentricity | | | |
|---|---|---|---|---|
|  | Average value [μm] | Standard deviation [μm] | x +3s [μm] | Number of samples |
| Comparative 1 | 24.64 | 12.05 | 80.79 | 100 |
| Comparative 2 | 17.94 | 11.10 | 51.24 | 100 |

While the values of concentricity measured on the products of the prior art are scattered significantly, the products of the present invention made by integrally molding the insert and the ferrule body made of resin showed better results with very small deviation in concentricity. Values of concentricity shown in Table 1 were obtained with Comparative 1 by machining the periphery after inserting the insert 10 with pressure into the stainless steel tube, and with Comparative Example 2 by machining the periphery before assembling the insert 10 with pressure.

Concentricity values were measured before machining the periphery, and Table 2 shows that the concentricity is too poor to satisfy the requirements for use of optical connectors.

On the other hand, the products in the Example of the present invention could achieve high concentricity as shown in Table 1, without machining on the periphery.

According to the present invention, as described above, the ferrule is produced by fastening the insert of substantially cylindrical shape, that has the fine hole for fastening an optical fiber, in a mold while aligning the fine hole at the center of the mold, then pouring the resin into the mold thereby to form the ferrule body by injection molding. As a consequence, the ferrule body can be made of resin with high accuracy and high concentricity, so that high performance can be achieved even without machining the insert or ferrule body to make the outer diameter having high accuracy and concentricity.

Thus an optical fiber connector having high reliability that is capable of achieving optical connection of optical fibers through reliable contact between ends of a pair ot ferrules can be provided by making the optical fiber connector using the optical fiber according to the present invention.

What is claimed is:

1. A ferrule for fixing an optical fiber comprising:
   a ferrule body of substantially cylindrical shape having a through hole along its axis; and
   an insert having a fine hole for accepting an end portion of an optical fiber;
   wherein the insert is embedded into an end face of the ferrule body,
   wherein at least an end face of the insert is exposed on the end face of the ferrule body,
   wherein the fine hole communicates with the through hole via a tapered face,
   wherein the ferrule body is formed of a synthetic resin, and the insert is made of ceramics and/or glass, and
   a concentricity of a peripheral diameter of the ferrule body with respect to the fine hole in the insert is set to 10 $\mu$m or less.

2. The ferrule according to claim 1 wherein the tapered face is formed in the ferrule body and the through hole communicates to the fine hole directly via the tapered face.

3. The ferrule for fixing an optical fiber according to claim 1, wherein the concentricity of a peripheral diameter of the ferrule body with respect to the fine hole in the insert is set to 6 $\mu$m or less.

4. The ferrule for fixing an optical fiber according to claim 1, wherein the concentricity of a peripheral diameter of the ferrule body with respect to the fine hole in the insert is set to 1.4 $\mu$m or less.

5. The ferrule for fixing an optical fiber according to claim 2, wherein the concentricity of a peripheral diameter of the ferrule body with respect to the fine hole in the insert is set to 6 $\mu$m or less.

6. The ferrule for fixing an optical fiber according to claim 2, wherein the concentricity of a peripheral diameter of the ferrule body with respect to the fine hole in the insert is set to 1.4 $\mu$m or less.

7. The ferrule for fixing an optical fiber according to claim 1 further comprising a flange integrally formed around the rear periphery of the ferrule body.

8. A ferrule for fixing an optical fiber comprising:
   a ferrule body of substantially cylindrical shape having a through hole along its axis; and
   an insert having a fine hole for accepting an end portion of an optical fiber and a tapered face at the opening of the fine hole;
   wherein the insert is embedded into an end face of the ferrule body,
   wherein an end face of the insert is substantially co-planar with the end face of the ferrule body,
   wherein the tapered face of the fine hole communicates with the through hole,
   wherein the ferrule body is formed of a synthetic resin, and the insert is made of ceramics and/or glass, and
   a concentricity of a peripheral diameter of the ferrule body with respect to the fine hole in the insert is set to 10 $\mu$m or less.

* * * * *